Patented June 12, 1951

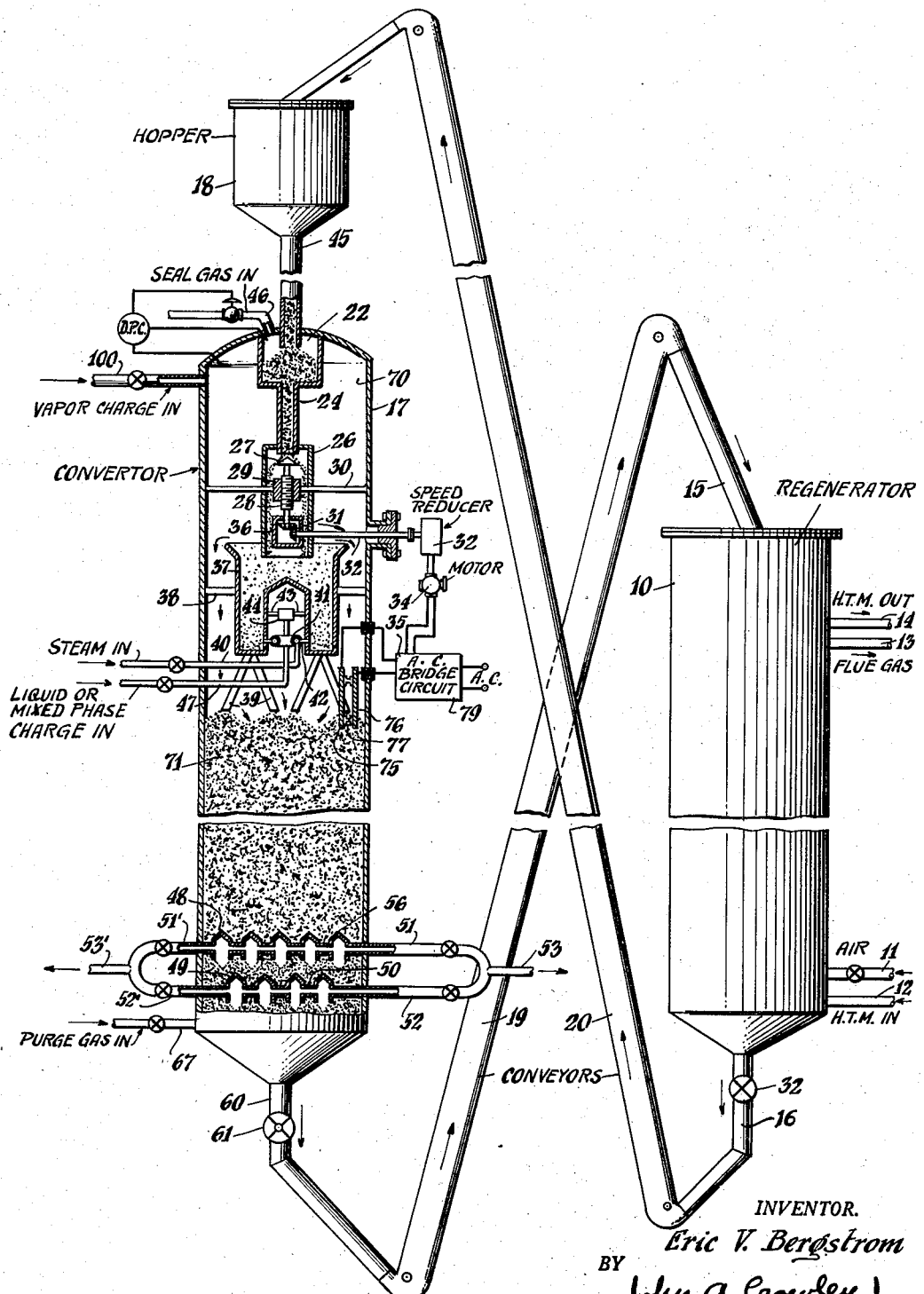

2,556,514

UNITED STATES PATENT OFFICE 2,556,514

METHOD AND APPARATUS FOR HYDRO-CARBON CONVERSION

Eric V. Bergstrom, Short Hills, N. J., assignor to Socony-Vacuum Oil Company, Incorporated, a corporation of New York Application February 10, 1949, Serial No. 75,641

19 Claims. (Cl. 196—52)

This application is a continuation-in-part of my application Serial Number 14,308, filed in the United States Patent Office March 11, 1948, now abandoned.

This invention has to do with a method and apparatus for conversion of high boiling liquid hydrocarbons or mixed phase hydrocarbons to lower boiling hydrocarbons in the presence of a moving particle-form contact mass material which may or may not exhibit catalytic properties with respect to the conversion reaction. Typical of such process is the catalytic conversion of heated liquid hydrocarbons to lower boiling gasoline containing gaseous products by the contacting of a high boiling liquid charge at temperatures of the order of 850° F. and upwards with a particle-form adsorbent catalytic material. Other exemplary process are the thermal visbreaking, coking or cracking of liquid or mixed phase hydrocarbon charge by contact with heated particle-form inert contact materials.

In such processes wherein the contact material is catalytic in nature it may partake of the nature of natural or treated clays, bauxite, activated alumina or synthetic associations of silica, alumina or silica and alumina to which other substances such as certain metallic oxides may be added in small amounts for specific purposes. When the contact material is inert in character it may partake of the form of refractory materials such as mullite, zirconium oxide, fused alumina, or Carborundum or it may partake of the form of stones or metallic particles or spheres.

This invention is specifically directed to certain method and apparatus improvements in a hydrocarbon conversion system wherein the contact material passes cyclically through a conversion zone wherein it is contacted at suitable conversion temperatures with a liquid or mixed phase high boiling liquid hydrocarbon charge to effect conversion thereof and then through a regeneration or reconditioning zone wherein it is contacted at elevated temperatures with a suitable gas for conditioning said contact material to a condition suitable for reuse in said conversion zone.

A type of conversion system which has met with wide commercial success because of its practical advantages is one wherein the contact material moves as a substantially compact column within the conversion zone. In such systems it has been customary to supply the contact material into the conversion chamber through one or more tubes extending downwardly through a short upper section of said chamber and terminating at the surface of the column of contact material within said chamber. When a liquid or mixed phase hydrocarbon charge is to be converted it is desirable to supply all or a large part of the heat required for conversion in the incoming contact material. This means that the incoming contact material and the tubes through which it enters and other metal surfaces in the upper section of the conversion vessel exist at temperatures sufficiently high to cause, upon contact by the liquid hydrocarbon charge, rapid conversion of said charge. As a result, there is a marked tendency for coke to form on the hot tubes and metal surfaces in the upper section of the conversion vessel. This coke eventually breaks off from the metal surfaces in large chunks which pass downwardly through the convertor and plug up restricted passages for solid flow near the lower end of the convertor and in other portions of the cyclic system. Another problem that may arise when an attempt is made to convert liquid hydrocarbons in the presence of a contact material is that of uniformly distributing the liquid hydrocarbon charge on the contact material in all portions of the vessel cross-sectional area and the prevention of liquid and vapor channeling through certain portions of the contact material column.

A major object of this invention is the provision in a system for conversion of liquid or mixed phase hydrocarbons in the presence of a particle-form contact material of an improved method and apparatus for hydrocarbon and contact material introduction to the conversion zone which avoids the difficulties hereinabove described.

A specific object is the provision in a continuous cyclic process for conversion of high boiling liquid and mixed phase hydrocarbon charges to lower boiling gaseous hydrocarbon products of a method and apparatus permitting uniform distribution of the hydrocarbon charge over the surface of the contact material in the conversion zone without excessive accumulation of coky deposits upon the metal surfaces within said zone.

These and other objects of this invention will become apparent from the following discussion of the invention.

This invention in its preferred form involves a method and apparatus wherein particle form contact material in heated condition is delivered into a bed of contact material which is maintained in a "boiling" or fluidized state so that the solid mass partakes of many of the flow properties of liquids. High boiling liquid or mixed phase hydrocarbon charge is injected into the fluidized bed preferably below the surface thereof whereby it becomes intimately mixed with the contact material and vaporized with or without a partial conversion of the hydrocarbons; and the resulting vapors are then passed through a compact moving column of the solid material in a final reaction zone to effect final conversion of the hydrocarbon charge. Contact material is continuously withdrawn from the fluidized mixing bed as supply to the compact moving column in the final reaction zone. The used contact material is withdrawn from the lower section of the final reaction zone, reconditioned for further use as by regeneration and returned in heated condition to the mixing zone.

The invention may be readily understood by reference to the attached drawing which is an elevational view, partially in section, of a preferred arrangement of the invention. This drawing is highly diagrammatic in form. Turning to the drawing, there is shown a regeneration vessel 10, provided with a combustion supporting gas inlet 11 and heat exchange fluid inlet 12 near its lower end and flue gas outlet 13 and heat exchange fluid outlet 14 near its upper end. The heat exchange fluid inlet and outlet connect into heat transfer tubes (not shown) distributed within the regenerator. Also provided is a solid material inlet 15 at the top of the regenerator and a solid material outlet 16 at the lower end thereof bearing a flow control valve 32. It will be understood that regenerators of other construction may be substituted for that shown within the scope of this invention as long as such modified constructions permit combustion regeneration of moving particles of spent contact mass materials at controlled elevated temperatures. In systems wherein the contact material is an inert material, the vessel 10 may take the form of a reconditioning apparatus in whatever form may be required for conditioning the contact material for reuse in the conversion zone. Also shown in Figure 1 is a convertor 17, a supply hopper 18 located thereabove and conveyors 19 and 20 adapted to transfer hot contact material particles between the regenerator and convertor vessels. The conveyors may take the form of continuous bucket elevators for example. Within the upper section of vessel 17 there is provided a seal chamber 22 into which contact material is supplied through gravity feed leg 45 and an inert seal gas such as steam or flue gas is supplied via pipe 46. A pipe 24 depends from the bottom of chamber 22 for withdrawal of contact material and the pipe 24 is provided with a continuation of expanded diameter 26 on its lower end a conical shaped member 27 adapted when properly positioned to restrict or stop the flow from pipe 24 is supported on a vertical threaded shaft 28. The shaft 28 is supported by the internally threaded spool 29 which is in turn rigidly supported from the vessel walls by rods 30. The shaft 28 is rotated by through gears 31 actuated by shaft 32 driven through speed reducer 33 by motor 34. The motor operation is controlled by means of the A. C. bridge circuit 35 in a manner which will be described hereinafter. The gears 31 are protected from contact with the contact material particles by gear box 36. The continuation feed tube 26 is closed at its upper end except as to pipe 24 and is open on its lower end. A basket-like container or receptacle 37 is supported by rods 38 below the lower end of tube 26 and its flared sidewalls extend upwardly to a level above the lower end of tube 26. In the arrangement shown the lower portion of basket container is of annular shape to permit better distribution of the solid material charge and more uniform contacting with the hydrocarbon charge but it is contemplated that the basket container may take other suitable shapes and forms. In general the basket container should be open on its upper end and of less diameter than the vessel 17 at the level of its greatest horizontal cross-section. A ring of feed pipes 39 depend downwardly from the annular bottom of container 37 and terminate on their lower ends at a common level at a plurality of points uniformly distributed over the horizontal cross-sectional area of vessel 17. The level of the lower ends of pipes 37 is spaced a substantial distance above the lower end of the conversion vessel 17 and preferably within the upper half thereof. A steam inlet pipe 40 connects into a ring manifold 41 from which a plurality of distributing pipes 42 extend into the lower annular section of container 37. A plurality of liquid oil distributor pipes 43 extend radially from a disc shaped header 44 into the container 37 a short distance above the steam pipes 42. Liquid oil may be supplied to header 44 via pipe 47. In the lower section of the vessel 17 there are provided two vertically spaced rows of spaced gable-roofed gas collecting troughs 48 and 49. Adjacent troughs are connected by means of nipples 50, and feed pipes 51 and 52 and 51' and 52' connect into the end troughs in rows 48 and 49 respectively. The pipes 51 and 52 and 51' and 52' are in turn manifolded into outlet pipes 53 and 53' respectively on opposite sides of the vessel. Below the level of troughs 49 there may be provided a suitable solid flow distribution arrangement to insure uniform withdrawal of solids from all portions of the vessel cross-sectional area through the outlet conduit 60. A suitable flow control system is described in Patent Number 2,412,136, dated December 3, 1946. A flow control valve 61 is positioned on conduit 60. A purge gas inlet 67 connects into suitable distributors (not shown) at a level within the vessel 17 below the troughs 49.

In operation contact material particles are supplied from hopper 18 through leg 45 into seal chamber 22. An inert gas is introduced into chamber 22 at a rate controlled by diaphragm valve 64 and differential pressure controller 65 which will provide an inert gas pressure in chamber 22 slightly above that in the gas space 70 above the column 71 in the reaction chamber. The sorbed material passes downwardly through pipe 24 and tube 26 onto the bed of solids in the container 37. Steam or flue gas or other suitable inert gas is introduced via pipes 42 into the lower section of container 37 at a rate controlled to maintain the bed in container in a boiling or fluid-like state. High boiling hydrocarbons such as petroleum residuum fraction in the liquid or mixed phase are injected via pipes 43 into the annular bed at spaced intervals around the container 37 and at a level shortly above that of the steam introduction. The liquid hydrocarbon charge is partially converted to lower boiling products and/or vaporized, the heat being supplied from the hot contact material, and the resulting gaseous hydrocarbons pass upwardly through the fluid-like bed. It should be understood that the term "gaseous" as employed herein in describing and in claiming this invention is employed in permit its fluidization by means of the gasification of the liquid or mixed phase charge introduced via pipe 47 alone. If desired, a gaseous charge such as a vaporized gas oil may be supplied into the reactor via pipe 100 in addition to that supplied via pipe 47. In this case the mixed gaseous products are withdrawn together from the lower section of the column 71.

By the process above described intimate contact and mixing of the liquid charge and the hot contact material charge is effected in the mixing zone 37. Uniform and rapid conversion of the liquid charge to lower boiling gaseous hydrocarbons and/or vaporization of the liquid charge occurs in the bed in zone 37 so that substantially the entire hydrocarbon charge is in the gaseous phase before it enters the column 71 thereby eliminating any chance of liquid channeling within the column 71. Moreover, the contact material feed is distributed uniformly and evenly over the surface of the bed both with respect to amount of solid material and with respect to the size distribution of the solid particles. Any segregation of fines which may exist in the stream entering through pipe 24 is eliminated within the boiling bed in the mixing zone so as to insure delivery of solid material of the same size distribution through all of the pipes 39. Moreover, the scrubbing action of the boiling solid particles in zone 37 effectively prevents the accumulation of any coke deposits on the metal walls of the container 37 and the vaporization of substantially the entire liquid charge within the bed in container 37 prevents contact of liquid charge with any other portion of the reactor shell thereby effectively eliminating coke accumulation along the walls of the convertor shell or on any of the solid feed pipes. All these advantages are accomplished by the method and apparatus of this invention while still providing the advantages of low contact material to hydrocarbon charge ratios, long contact material contact time with the hydrocarbons, low contact material attrition and uniform conversion results due to the absence of channeling which are characteristic of systems involving gasiform reactant flow through a compact moving column of contact material within the reaction zone.

The exact dimensions of the several elements which make up the improved apparatus of this invention will, of course, be dependent to a certain extent upon the particular operation and operating conditions for which the apparatus is to be employed. As an example of a satisfactory construction, in a catalytic cracking reactor having a diameter of about 12 feet, there may be employed a container 37 measuring about 6 feet in height, 10 feet in diameter at the upper edge, 6 feet in diameter at the base of the flared section, and having an annular lower portion about 4–5 feet in height and about 8–12 inches in horizontal width and 6 feet in outer diameter. The upper edge of the container may extend about 8–12 inches above the lower end of tube 26. The pipe 24 may be about 12 inches in diameter and the tube 26 about 24 inches in diameter. About 24 pipes 39 of about 4 inches diameter may be provided for flow of catalyst onto the column 71. The liquid oil may be supplied into the container 37 through 24 one half inch standard size pipes radiating from the header 44. A similar number of steam pipes 42 may be provided. The length of the catalyst column between its surface and the hydrocarbon outlet troughs should be about 7–30 feet. Such an apparatus will handle a high boiling liquid petroleum charge of 2,000 barrels per day and in addition a vaporized gas oil charge entering via pipe 100 of about 11,000 liquid barrels per day. The rate of steam introduction via pipe 40 should be of the order of 4,500 pounds per hour.

The conditions of operation in the apparatus of this invention will vary widely depending upon the particular operational application involved. In general, the contact material should be supplied at a temperature suitable to support the conversion desired. This temperature will vary somewhat depending upon the particular contact material to oil ratio chosen. In catalytic cracking operations on clay-type catalysts, the contact material charge to oil charge ratio may vary from about 1.0 to 20 parts by weight of contact material per part of oil. The oil space velocity may be within the range of about 0.3 to 10.0 volumes of oil (measured at 60° F.) per hour per volume of contact material column within the conversion zone. The contact material in the case of catalytic cracking operations may enter the conversion chamber at temperatures of the order of 800° F. to 1200° F., and may undergo a temperature drop of the order of 15° F. to 300° F. in passing through the conversion zone. In the case of thermal cracking operations over inert contact materials, the contact material temperature may be much higher.

In such a process, it has been found desirable to control the contact material particle size broadly within the range 3 to 100 mesh and preferably within the range about 4 to 20 mesh by Tyler standard screen analysis. The percentage of fines present in the contact material mass should be maintained as low as possible.

The invention may be employed for conversion of hydrocarbon charge stocks which are partially vaporizable under the conversion conditions or it may be employed for the conversion of reduced crudes and the like which consist for the most part of hydrocarbons boiling above the desired average conversion temperature. It is usually preferable to heat the hydrocarbon charge to a temperature of the order of 600° F. before introducing it into the conversion chamber.

It should be understood that the particular details of apparatus construction and the examples of operating conditions and process applications of the invention given hereinabove are intended as illustrative and are in no way to be construed as limiting the scope of this invention except as it may be limited by the following claims.

I claim:

1. The method for converting high boiling liquid hydrocarbons to lower boiling gaseous hydrocarbons which comprises: maintaining a substantially compact column of particle-form contact material within a confined, elongated conversion zone, causing said contact material in said column to move downwardly by withdrawing used contact material at a controlled rate from the lower section of said conversion zone, maintaining a fluidized liquid simulating bed of particle form contact material within a confined mixing zone, supplying contact material at a suitable temperature for supplying at least a substantial part of the heat required for the hydrocarbon conversion to said bed, supplying a high boiling fluid hydrocarbon charge at least partially in the liquid phase to said bed to effect intimate mixing of said hydrocarbons with the contact material and conversion of said hydrocarbon charge to gaseous hydrocarbons, withdrawing the gaseous hydrocarbons upwardly a broad sense as meaning that the material involved is in the gaseous condition at the particular temperature and pressure conditions involved regardless of what may be the normal phase of that material under ordinary atmospheric conditions. The expression "conversion of the hydrocarbon charge to gaseous hydrocarbons" and similar expressions as employed herein in connection with the mixing zone 37 in describing and claiming this invention is intended in a broad sense as covering the transformation of a liquid phase hydrocarbon charge to hydrocarbons existing in the gaseous phase either by virtue of splitting the hydrocarbon charge molecules to lower boiling molecules or by vaporization or both. The contact material is supplied to the bed in mixing zone 37 at a conversion supporting temperature, that is at a temperature which, for the particular solid feed rate involved, is sufficiently high to supply at least most of the heat required for effecting conversion of the liquid or partially liquid hydrocarbon charge to the lower boiling gaseous product withdrawn via pipes 51, 51', 52 and 52' without the contact material being cooled below a suitable hydrocarbon reaction temperature or below the condensation temperature of the gaseous hydrocarbon products. It is in this sense that the expression conversion supporting temperature is employed in the claims. The gaseous hydrocarbon material discharged from the surface of the fluidized bed in container 37 passes downwardly as indicated by the arrows in the drawing into and through the substantially compact column of solid material 71 wherein its final conversion is effected. The gaseous products are withdrawn from the lower section of column 71 through collector trough 48 and 49 and pipes 51 and 52, and 51' and 52' respectively. The flow in pipes 51, 52, 51' and 52' is throttled so as to provide the proper flow of products from each row of collector troughs.

The contact material, bearing any of the hydrocarbon charge which has not been vaporized, discharges from container 37 onto the surface of column 71 via pipes 39. Usually the surface level of the bed in container 37 reaches a level somewhat above the lower end of tube 26. This tendency for rise in bed level is counteracted partially by means of flaring the upper upper end of container 37 so that the linear rate of gas flow as it discharges from the bed is somewhat lower than that in the annular lower portion of the bed. In some operations wherein the rate of oil charge into the bed is high some of the solid material may overflow the upper edges of the container 37 and drop onto the surface of column 71. Under such conditions there is a tendency for solid material to feed through tube 26 at a higher rate than it is discharged from the bottom of vessel 17, thereby causing a build up in the surface level of column 71 due to the overflow. In order to prevent excessive build up in column level in such operations a level control device is provided. This may take any of a number of forms. The device shown involves two spaced apart electrical condenser plates 75 and 76 held apart by insulators 77 and supported from the vessel shell near the level of the lower ends of pipes 39 by a suitable means (not shown). As the contact material column level rises, solid material fills in the space between the plates 75 and 76 and upon change in level causes a change in the dielectric resistance between the condenser plates.

The plates are connected into a suitable A. C. bridge circuit 79 which may be of conventional type and the plates act to set up varying currents in the bridge circuit in response to changes in the surface level of the column of contact material. The bridge circuit is adapted to operate the motor 34 in such a manner as to cause it to turn the shaft 32 in a direction which will raise the cone 27 towards the level of pipe 24 when the surface of column 71 rises above a predetermined level along plates 75 and 76 and to lower cone 27 when the level of column 71 falls below a predetermined level. Thereby the surface level of column 71 may be controlled within a relatively narrow range of levels falling within a vertical length of the vessel 17 amounting to about 2–12 inches. The used contact material is purged by means of an inert purge gas such as steam or flue gas entering via pipe 67 and then passes from vessel 17 through pipe 69 at a suitable rate controlled by valve 61. The used contact material passes via conduit 60 into conveyor 19 by which it is conducted to vessel 10. If the contact material is an adsorbent catalyst, air or other oxygen containing gas is introduced at 11 into vessel 10 to burn the carbonaceous contaminant from the contact material. Flue gas may be withdrawn at 13. A suitable heat exchange fluid introduced at conduit 12 and withdrawn at conduit 14 may be passed through tubes within vessel 10 which communicate with conduits 12 and 14 under conditions suitable to control the regenerating catalyst temperature below a heat damaging level. For clay type adsorbents the heat damaging level is of the order of 1200° F. while for gel-type catalysts it may be somewhat higher. Regenerated contact material flows via conduit 16 to conveyor 20 by which it is returned to reactor supply hopper 18.

It should be understood that the invention is not considered to be limited to the specific apparatus construction described hereinabove. Reaction vessels having cross-sectional shapes other than circular as shown may be employed. In such cases the shape of container 37 should be modified accordingly. In less preferred forms of the invention it is visualized that the fluidized bed may be positioned in locations within the conversion vessel other than that shown in which case other means which will be apparent to those skilled in the art may be provided for delivery of the contact material from the fluidized bed to the compact reaction column. In some operations it is contemplated that catalyst may be supplied at a low point in the fluidized bed and that all of the catalyst and oil charge may overflow from the fluidized bed and fall onto the compact column. Also it is contemplated that the fluidized mixing zone may be positioned entirely outside the convertor 17. In some less preferred operations additional contact material over and above that from the mixing zone may be supplied to the column 71 in the conversion zone. Also, it is contemplated that in less preferred forms of the invention the direction of reactant flow through column 71 may be other than downward. Other suitable means may be employed for throttling the flow of solids from pipe 24 and for many operations the throttle device at this point may be eliminated entirely. In many operations gaseous hydrocarbons may be supplied instead of steam into pipe 40 to effect fluidization of the bed in container 37 and, if desired, the bed may be so proportioned as to from the surface of said bed and passing the gaseous hydrocarbons downwardly through at least a portion of said column of contact material in said conversion zone to effect the final conversion thereof to a lower boiling gaseous hydrocarbon product, withdrawing said gaseous product from said column and passing contact material from said fluidized bed to said column.

2. The method for converting high boiling liquid phase hydrocarbons to lower boiling gaseous hydrocarbons which comprises: maintaining a fluidized, liquid simulating bed of particle form solid contact material in a mixing zone, supplying a high boiling fluid hydrocarbon charge into said bed below the surface thereof at least partially in the liquid phase to mix with the contact material and to effect conversion of said charge to gaseous hydrocarbons, passing contacted solid material from said bed downwardly through a confined conversion zone wherein it is maintained as a substantially compact column of gravitating particles, replenishing said bed with fresh contact material heated to a conversion supporting temperature, passing the gaseous hydrocarbons formed upwardly within said bed to at least aid in maintaining it in fluidized condition, withdrawing the gaseous hydrocarbons from the surface of said bed and passing the gaseous hydrocarbons downwardly through said column to complete the conversion of the charge to a lower boiling gaseous hydrocarbon product, withdrawing said product from the lower section of said column, and separately withdrawing used contact material from the lower section of said column.

3. The method for converting high boiling liquid and mixed phase hydrocarbons to lower boiling gaseous hydrocarbons which comprises: maintaining a substantially compact column of gravitating particle form catalyst within a confined conversion zone, maintaining a fluidized bed of said catalyst in a mixing zone above said conversion zone, introducing a high boiling liquid charge at least partially into the lower portion of said bed to mix with the catalyst and to become converted to gaseous hydrocarbons, passing the gaseous hydrocarbons so formed upwardly through said bed and withdrawing it from the surface thereof, passing the withdrawn gaseous hydrocarbons downwardly through said column of catalyst in said conversion zone to effect conversion to a gasoline containing gaseous hydrocarbon product, withdrawing said product from the lower section of said column, separately withdrawing used catalyst bearing a carbonaceous contaminant from the lower section of said column, passing catalyst from said fluidized bed downwardly by gravity flow onto the surface of said column to replenish the same and maintaining the surface level of said column substantially constant, replenishing said bed with freshly regenerated catalyst at a temperature suitable for supplying at least most of the heat required for conversion of said hydrocarbon charge to said gasoline containing product, passing the catalyst withdrawn from said column through a confined regeneration zone while contacting it with a combustion supporting gas to burn off the carbonaceous contaminant, and returning the hot regenerated catalyst to said mixing zone as the catalyst supply thereto.

4. The method for converting high boiling liquid phase hydrocarbons to lower boiling gaseous hydrocarbons which comprises: maintaining a substantially compact column of gravitating particle form contact material within a confined conversion zone, maintaining a fluidized bed of said contact material in a mixing zone above said conversion zone, introducing an inert gaseous material into the lower portion of said bed and passing it upwardly through said bed to aid in maintaining it in fluidized condition, introducing a high boiling petroleum charge at least partially in liquid form into said bed to transform said charge into gaseous hydrocarbon material and passing the gaseous hydrocarbon material upwardly through said bed also to aid in maintaining it in a fluidized condition, withdrawing the gaseous hydrocarbon material from the surface of said bed and passing it downwardly through said column of catalyst in said conversion zone to effect conversion to a gasoline containing gaseous hydrocarbon product, withdrawing said product from the lower section of said column, separately withdrawing used contact material from the lower section of said column, passing contact material from said fluidized bed downwardly by gravity flow onto the surface of said column to replenish the same and controlling the surface level of said column within a fixed narrow range of levels, replenishing said bed with fresh, heated contact material at a temperature suitable for supplying at least most of the heat required to convert the liquid charge into said gaseous hydrocarbon product.

5. The method for converting high boiling liquid phase hydrocarbons to lower boiling gaseous hydrocarbons which comprises: maintaining a substantially compact column of gravitating particle from catalyst within a confined conversion zone, maintaining a fluidized bed of said catalyst in a mixing zone above said conversion zone, introducing a high boiling liquid charge at least partially into the lower portion of said bed to mix with the catalyst and to become converted to gaseous hydrocarbons, passing the gaseous hydrocarbons so formed upwardly through said bed and withdrawing it from the surface thereof, passing the withdrawn gaseous hydrocarbons downwardly through said column of catalyst in admixture with a stream of vaporized hydrocarbon charge boiling below said liquid charge and introduced separately into said conversion zone to effect conversion of the mixed hydrocarbon charge to a lower boiling gasoline containing gaseous hydrocarbon product, withdrawing said product from the lower section of said column, separately withdrawing used catalyst bearing a carbonaceous contaminant from the lower section of said column, passing catalyst from said fluidized bed downwardly by gravity flow onto the surface of said column to replenish the same and maintaining the surface level of said column substantially constant, replenishing said bed with freshly regenerated catalyst at a temperature suitable for supplying at least most of the heat required for conversion of said hydrocarbon charge to said gasoline containing product, passing the catalyst withdrawn from said column through a confined regeneration zone while contacting it with a combustion supporting gas to burn off the carbonaceous contaminant, and returning the hot regenerated catalyst to said mixing zone as the catalyst supply thereto.

6. The method for converting high boiling liquid phase hydrocarbons to lower boiling gaseous hydrocarbons which comprises: maintaining a substantially compact column of particle-form contact material within a lower portion of a confined elongated conversion zone, maintaining a fluidized bed of boiling contact material within an upper portion of said conversion zone spaced above said column and having its surface unconfined and in free flow communication with said conversion therebelow, withdrawing used contact material from the lower section of said column and passing contact material downwardly from said bed onto the surface of said column to replenish the same, directing a confined stream of hot, fresh contact material into said bed at a temperature suitable for supporting the hydrocarbon conversion, introducing a high boiling hydrocarbon charge at least partially in the liquid phase into said column to mix with the boiling contact material and to effect conversion of the liquid hydrocarbon charge to gaseous hydrocarbon material, flowing the gaseous material upwardly within said bed to aid in maintaining it in a fluidized condition, withdrawing the gaseous material from the surface of said bed and directing it downwardly into and through said column to effect final conversion to lower boiling gaseous products and withdrawing said lower boiling products from the lower section of said column.

7. The method for converting high boiling liquid phase hydrocarbons to lower boiling gaseous hydrocarbons which comprises: maintaining a substantially compact column of particle-form contact material within a lower portion of a confined elongated conversion zone, maintaining a partially confined fluidized bed of boiling contact material within an upper portion of said conversion zone spaced above the surface of said column, said bed extending less than entirely across said zone and being unconfined on its surface so that the surface of said bed is in free gas flow communication with the surface of said column, withdrawing used contact material from the lower section of said column, passing contact material from the lower section of said fluidized bed onto the surface of said column as a plurality of confined substantially compact gravity flowing streams to replenish said column, supplying fresh contact material at a temperature above the average hydrocarbon conversion temperature in said conversion zone into said fluidized bed in at least one confined gravity flowing stream, controlling the rate of contact material supply into said fluidized bed to maintain the surface level of said column within a constant narrow range of levels, introducing a high boiling hydrocarbon charge at least partially in the liquid phase into said bed to mix with the boiling contact material and to effect conversion of the liquid hydrocarbon charge to gaseous hydrocarbon material, flowing the gaseous material upwardly within said bed to aid in maintaining it in a fluidized condition, withdrawing the gaseous material from the surface of said bed and directing it downwardly into said column of contact material, passing said gaseous hydrocarbon material downwardly within said column to effect final conversion to lower boiling gaseous products and withdrawing said lower boiling products from the lower section of said column.

8. A process for catalytic conversion of a high boiling liquid hydrocarbon charge to a lower boiling gasoline containing product comprising: maintaining a substantially compact column of downwardly moving particles of adsorbent catalyst within a lower portion of a confined conversion zone leaving a substantial gas space within said zone above the surface of said column, maintaining a partially confined bed of said catalyst suspended above the surface of said column within said gas space zone, said bed being open on top to said gas space confining said bed to a horizontally central portion of said gas space so as to provide a communicating free gas passage between the surface of said bed and the surface of said column, introducing a suitable inert gas into the lower section of said bed, separately introducing the high boiling hydrocarbon charge at least partially in the liquid phase into said bed to mix with the catalyst and to effect conversion of said hydrocarbon charge to gaseous hydrocarbon material, passing the inert gas and gaseous hydrocarbon material upwardly within said bed and controlling the rate of introduction of the inert gas and the hydrocarbon charge to maintain said bed in a fluidized, liquid simulating condition, disengaging the gaseous hydrocarbon material and inert gas from the surface of said bed and directing it downwardly into said column of catalyst and passing the same downwardly within said column to complete the conversion of said hydrocarbon material to a lower boiling gasoline containing product, withdrawing said gasoline containing product from the lower section of said column, separately withdrawing used catalyst bearing a carbonaceous deposit from the lower section of said column, passing catalyst downwardly from said fluidized bed as a plurality of substantially compact gravitating steams delivering onto the surface of said column at a plurality of points uniformly distributed over its surface area, introducing hot, regenerated catalyst in a confined stream onto said fluidized bed and controlling the rate of introduction of said regenerated catalyst to limit overflow of catalyst from said fluidized bed below that which would cause a substantial rise in the surface level of said column, passing the used catalyst withdrawn from said column through a confined regeneration zone in contact with an oxygen containing gas while controlling the catalyst temperature at a level suitable for combustion of the deposit on the catalyst but below a catalyst heat damaging level and employing the regenerated catalyst as the supply for said fluidized bed.

9. A process for catalytic conversion of a high boiling liquid hydrocarbon charge to a lower boiling gasoline containing product comprising: maintaining a substantially compact column of downwardly moving particles of adsorbent catalyst within a lower portion of a confined conversion zone leaving a substantial gas space within said zone above the surface of said column, maintaining a partially confined bed of said catalyst suspended above the surface of said column within said gas space, said bed being of annular shape at least throughout its lower section and being open on top to said gas space, restricting said bed laterally to a central portion of said gas space so as to provide a communicating free gas passage between the surface of said bed and the surface of said column, introducing a suitable inert gas into the lower section of said bed, separately introducing the high boiling hydrocarbon charge at least partially in the liquid phase into said bed to mix with the catalyst and to effect conversion of said hydrocarbon charge to gaseous hydrocarbon material, passing the inert gas and gaseous hydrocarbon material upwardly within said bed and controlling the rate of introduction of the inert gas and the hydrocarbon charge to maintain said bed in a fluidized, liquid simulating condition, disengaging the gaseous hydrocarbon material and inert gas from the surface of said bed and directing it downwardly into said column of catalyst and passing the same downwardly within said column to complete the conversion of said hydrocarbon material to a lower boiling gasoline containing product, introducing a vaporized hydrocarbon charge of lower boiling range than said high boiling charge into said gas space above said column and also passing said vaporized charge downwardly through said column to effect conversion thereof to a lower boiling hydrocarbon product, withdrawing the mixed lower boiling hydrocarbon products together from the lower section of said column, separately withdrawing used catalyst bearing a carbonaceous deposit from the lower section of said column passing catalyst downwardly from said fluidized bed as a plurality of substantially compact gravitating streams delivering onto the surface of said column at a plurality of points uniformly distributed over its surface area, introducing hot, regenerated catalyst in a confined stream onto said fluidized bed and controlling the rate of introduction of said regenerated catalyst to limit overflow of catalyst from said fluidized bed below that which would cause a substantial rise in the surface level of said column, passing the used catalyst withdrawn from said column through a confined regeneration zone in contact with an oxygen containing gas while controlling the catalyst temperature at a level suitable for combustion of the deposit on the catalyst but below a catalyst heat damaging level and employing the regenerated catalyst as the supply for said fluidized bed.

10. An apparatus for conversion of high boiling hydrocarbons to lower boiling products comprising: an elongated conversion chamber adapted to confine a substantially compact column of contact material, a receptacle open on top and adapted to laterally confine a bed of contact material supported in the upper section of said conversion chamber and extending laterally only partially across said chamber so as to provide a communicating passage between the open upper end of said receptacle and the portion of the conversion chamber therebelow, passage defining members to introduce a liquid reactant charge into the lower portion of said receptacle at a plurality of spaced points, conduit means for supply of contact material into the upper portion of said receptacle, a plurality of conduits for solid flow extending downwardly from said receptacle and terminating at a substantially common level at a plurality of points uniformly distributed over the horizontal cross-sectional area of said conversion chamber, said common level being spaced a substantial distance above the lower end of said chamber, means to withdraw gaseous products from the lower section of said conversion chamber, conduit means to withdraw contact material from the lower section of said conversion chamber, and flow throttling means associated with said last named conduit means.

11. An apparatus for conversion of high boiling hydrocarbons to lower boiling products comprising: an elongated conversion chamber adapted to confine a substantially compact column of contact material, a receptacle open on top and adapted to laterally confine a bed of contact material supported in an upper portion of said conversion chamber and extending laterally only partially across said chamber so as to provide a communicating gas passage between the open upper end of said receptacle and a portion of said conversion chamber therebelow, a plurality of liquid oil charge distributing devices connecting at uniformly spaced points around the lower section of said receptacle, conduit means to supply liquid oil to said distributing devices, conduit means to supply contact material to the upper section of said receptacle, a plurality of conduits for solid flow extending downwardly from the lower section of said receptacle and terminating therebelow at a common level spaced a substantial distance above the lower end of said conversion chamber at a plurality of points uniformly distributed over the horizontal cross-sectional area of said chamber, means to withdraw gaseous products from the lower section of said conversion chamber, conduit means for withdrawal of contact material from the lower section of said conversion chamber, a flow throttling device associated with said last named conduit means, and a level control device adapted to control the surface level of a column of contact material within a narrow range of levels within said conversion chamber which are below said receptacle but substantially spaced above the lower end of said conversion chamber.

12. An apparatus for conversion of high boiling hydrocarbons to lower boiling products comprising: an elongated conversion chamber adapted to confine a substantially compact column of contact material, a receptacle open on top and adapted to laterally confine a bed of contact material supported in the upper section of said conversion chamber and extending laterally only partially across said chamber so as to provide a communicating passage between the open upper end of said receptacle and the portion of the conversion chamber therebelow, a plurality of distributing devices adapted to distribute steam into said receptacle near the bottom thereof at a plurality of uniformly spaced apart points, conduit means to supply an inert gas to said distributing devices, a second plurality of distributing devices adapted to distribute a liquid hydrocarbon charge into said receptacle at a plurality of uniformly distributed points spaced above said first named distributing devices, conduit means to supply liquid hydrocarbon charge to said last named distributing devices, conduit means for flow of solid contact material into the upper portion of said receptacle, a plurality of conduits for solid flow extending downwardly from said receptacle and terminating at a substantially common level at a plurality of points uniformly distributed over the horizontal cross-sectional area of said conversion chamber, said common level being spaced a substantial distance above the lower end of said conversion chamber, conduit means to withdraw gaseous hydrocarbon products from lower section of said conversion chamber, conduit means to withdraw contact material from the lower section of said conversion chamber and a flow throttling device associated with said last named conduit means.

13. An apparatus for conversion of high boiling fluid hydrocarbons to lower boiling hydrocarbons in the presence of a moving column of particle form contact material which apparatus comprises in combination: means defining an elongated conversion chamber adapted to confine within a lower portion thereof a substantially compact column of contact material therein, a basin adapted to laterally confine to a central portion of said chamber a bed of said contact material supported within an upper portion of said chamber, conduit means for flowing fresh contact material into the upper section of said basin, a flow throttling device associated with said last named conduit means, a plurality of conduits for solid flow extending downwardly from the bottom of said basin and terminating therebelow at a common level within said conversion chamber spaced a substantial distance above the lower end thereof, a level indicating device adapted to actuate said flow throttling device in a manner which will counteract any substantial change in contact material column level above or below said common level, a plurality of liquid oil charge distributing devices connecting into a lower section of said basin at a plurality of uniformly distributed points, means to supply liquid oil to said distributing devices, means to withdraw gaseous hydrocarbon products from the lower section of said conversion chamber, conduit means to withdraw contact material from the lower section of said conversion chamber and a flow throttling device associated with said last named conduit means, a separate regeneration chamber, means to supply contact material withdrawn from said conversion chamber to said regeneration chamber, means to pass a combustion supporting gas through said regeneration chamber, an outlet from said regeneration chamber for withdrawal of regenerated contact material, means to supply the withdrawn regenerated contact material to said conduit means supplying said basin.

14. An apparatus for conversion of high boiling liquid hydrocarbons to lower boiling hydrocarbons in the presence of a moving column of particle form contact material which apparatus comprises in combination: means defining an elongated conversion chamber adapted to confine within its lower portion a substantially compact moving column of particle-form contact material, partition defining a seal chamber at the upper end of said conversion chamber, a conduit means to supply a seal gas into said seal chamber, a supply hopper spaced above said conversion chamber, substantially vertical conduit means for gravity flow of contact material from said supply hopper extending into said seal chamber, a receptacle open on top and adapted to laterally confine a bed of contact material within a horizontal central portion of said chamber supported within upper portion of said conversion chamber at a level spaced below said seal chamber, said receptacle being of smaller diameter than said conversion chamber so as to leave an annular gas space between the walls of said conversion chamber and said receptacle, conduit means for solid flow extending downwardly from said seal chamber and terminating near the open upper end of said receptacle, a plurality of conduits depending downwardly from the lower section of said receptacle and terminating therebelow at a common level which is a substantial distance above the lower end of said chamber at a plurality of points uniformly distributed across the horizontal cross-sectional area of said conversion chamber, a plurality of distributing devices connecting into the lower section of said receptacle at a plurality of uniformly spaced points, conduit means to supply steam to said distributing devices, a second plurality of distributing devices connecting into said receptacle above said first named distributing devices but below the upper end of said receptacle at a plurality of uniformly distributed points, conduit means for supply of fluid hydrocarbon charge to said second named distributing devices, a plurality of collector devices for gaseous product disengagement positioned within lower section of said conversion chamber, passage defining means for withdrawal of gaseous products from said collecting devices, conduit means for withdrawal of contact material from the lower end of said conversion chamber, flow throttling device associated with said last named conduit means, a level control device adapted to control the surface level of a column of contact material within a narrow range of levels in said conversion chamber near the lower ends of said conduits depending from said receptacle, a separate regeneration chamber having a contact material inlet at its upper end and a contact material outlet at its lower end, means to transfer contact material withdrawn from said conversion chamber to said inlet to said regeneration chamber, means to introduce air into said regeneration chamber, means to withdraw gaseous regeneration products from said regeneration chamber, a flow throttling device on said outlet from said regeneration chamber, and means to transfer regenerated contact material withdrawn from said regeneration chamber to said supply hopper.

15. An apparatus for conversion of high boiling hydrocarbons to lower boiling products comprising: an elongated chamber adapted to confine within a lower portion thereof a substantially compact column of contact material, a receptacle centrally positioned within an upper portion of said conversion chamber, said receptacle being of generally circular, horizontal cross-sectional shape throughout its upper section and being of generally annular shape throughout its lower section and being of substantially less diameter than said conversion chamber at its broadest lateral dimension, conduit means to supply contact material into the upper section of said receptacle, a plurality of conduit means for solid flow depending from said receptacle and terminating therebelow at a substantially constant level within said conversion chamber which is spaced a substantial distance above the lower end thereof, a plurality of distributing devices connecting into the annular portion of said receptacle at a plurality of uniformly spaced points, means for supply of fluid hydrocarbon charge to said distributing devices, means to withdraw hydrocarbon products from the lower section of said conversion chamber, conduit means for withdrawal of contact material from the lower section of said conversion chamber and a flow throttling device associated with said last named conduit means.

16. An apparatus for conversion of high boiling hydrocarbons to lower boiling products comprising: an elongated chamber adapted to confine within a lower portion thereof a substantially compact column of contact material, a basin flared outwardly on its upper open end positioned centrally within an upper section of said conversion chamber, an annular shaped extension depending downwardly from the bottom of said basin enclosed on its lower end, said annular shaped extension being of substantially less horizontal cross-sectional area than the basin, said basin having a substantially smaller maximum lateral dimension than said conversion chamber so as to provide an annular gas passage between the basin and annular extension and the shell of said conversion chamber, conduit means for supply of contact material into the upper section of said basin, a plurality of conduits depending downwardly from the bottom of said annular extension and terminating at a substantially constant level within the upper half of the conversion chamber at a plurality of points uniformly distributed over the horizontal cross-sectional area of said conversion chamber, a plurality of distributing pipes connecting into said extension near the lower end thereof at a plurality of uniformly spaced points, means to supply steam to said distributing pipes, a second plurality of distributing pipes connecting into said annular shaped extension at a plurality of uniformly spaced points at a level above said first named plurality of distributing pipes, means to supply fluid hydrocarbon charge to said second named plurality of distributing pipes, means to withdraw gaseous hydrocarbons from the lower section of said conversion chamber, and conduit means to withdraw contact material from the lower section of said conversion chamber.

17. An apparatus for conversion of high boiling hydrocarbons to lower boiling products comprising in combination: an elongated conversion chamber adapted to confine within a lower portion thereof a substantially compact column of moving contact material particles, means defining a seal chamber within the upper end of said conversion chamber, conduit means to supply seal gas into said seal chamber, conduit means for flow of contact material into said seal chamber, a receptacle open on top supported centrally within an upper portion of said conversion chamber below said seal chamber, said receptacle being of less lateral dimension than said conversion chamber so as to leave an annular gas passage between said receptacle and the shell of said conversion chamber, conduit means for solid flow depending downwardly from said seal chamber and terminating near the upper end of said receptacle leaving a gas space within said conversion chamber above said receptacle and surrounding said conduit means, a flow throttling device associated with said conduit means depending from said seal chamber, conduit means connecting into said gas space for supply of vaporized hydrocarbon charge to said conversion chamber, a plurality of conduits for solid flow extending downwardly from the bottom of said receptacle and terminating therebelow at a substantially common level within said conversion chamber, said common level being spaced a substantial distance above the lower end of said conversion chamber, a level indicating device positioned in the vicinity of said common level within said conversion chamber, a control device actuated by said level indicating device adapted to operate said flow control device associated with said conduit depending from said seal chamber, a plurality of distributing devices connecting into said receptacle at a plurality of points near its bottom and means to supply steam to said distributing devices, a second plurality of distributing devices connecting into said receptacle above said first named distributing devices but below the upper end of said receptacle, means to supply liquid hydrocarbon charge to said second named plurality of distributing devices, means to withdraw gaseous hydrocarbons from the lower section of said conversion chamber, conduit means for withdrawal of solid contact material from the lower section of said conversion chamber and flow throttling device associated with said last named conduit means.

18. The method for converting high boiling liquid hydrocarbons to lower boiling hydrocarbons which comprises: maintaining a substantially compact column of particle-form contact material within a confined, elongated conversion zone, causing said contact material in said column to move downwardly by withdrawing used contact material at a controlled rate from the lower section of said conversion zone, maintaining a fluidized liquid simulating bed of particle form contact material within a confined mixing zone, supplying contact material at a suitable temperature for the hydrocarbon conversion to said bed, supplying a high boiling fluid hydrocarbon charge at least partially in the liquid phase to said bed to effect intimate mixing of the hydrocarbon charge with the contact material and transformation of said charge to hydrocarbons existing in the gaseous phase, flowing said hydrocarbons in the gaseous phase in an upward direction to effect withdrawal from said bed and then passing said hydrocarbons through at least a portion of said column of contact material in said conversion zone to effect conversion thereof to lower boiling hydrocarbons, withdrawing said lower boiling hydrocarbons in the gaseous phase from said column and passing contact material from said fluidized bed to said column.

19. The method for converting high boiling liquid hydrocarbons to lower boiling hydrocarbons comprising: supplying hot particle form contact material to a mixing zone to replenish a bed of said contact material therein maintained as a boiling bed by upward flow of gas relative to the particles in said bed, supplying a high boiling fluid hydrocarbon charge existing at least partially in the liquid phase to said bed to effect intimate mixing of the hydrocarbon charge with the contact material and transformation of said charge to hydrocarbons existing in the gaseous phase, said hot contact material being supplied to said bed at a temperature sufficiently high to supply at least most of the heat required to effect said transformation, passing the gaseous phase hydrocarbons and the contact material bearing any deposited liquid hydrocarbons from said mixing zone to a substantially compact column of downwardly flowing contact material in a conversion zone wherein the hydrocarbons are converted to a lower boiling hydrocarbon product and withdrawing said product from said column.

ERIC V. BERGSTROM.

REFERENCES CITED

The following references are of record in the file of this patent:

UNITED STATES PATENTS

| Number | Name | Date |
|---|---|---|
| 2,302,328 | Kelley | Nov. 17, 1942 |
| 2,376,190 | Roetheli et al. | May 15, 1945 |
| 2,438,261 | Utterback | Mar. 23, 1948 |
| 2,441,170 | Rose et al. | May 11, 1948 |